United States Patent [19]

Singleton

[11] 4,151,107
[45] Apr. 24, 1979

[54] CATALYSIS OF WATER-GAS SHIFT REACTION

[75] Inventor: Thomas C. Singleton, Texas City, Tex.

[73] Assignee: Monsanto Company, St. Louis, Mo.

[21] Appl. No.: 801,954

[22] Filed: May 31, 1977

[51] Int. Cl.² .............................................. C07C 1/02
[52] U.S. Cl. ................................... 252/373; 423/437; 423/655
[58] Field of Search ............... 423/655, 656, 437, 481; 252/373

[56] References Cited

U.S. PATENT DOCUMENTS 3,761,579  9/1973  Curtis, Jr. et al. ............... 423/481 X

OTHER PUBLICATIONS

"Homogeneous Catalysis of the Water Gas Shift Reactions Using Rhodium Carbonyl Iodide", Cheng et al, J.A.C.S., Apr. 13, 1977, pp. 2791, 2792.
Chem. and Eng. News, Jun. 6, 1977, pp. 26–28, Eisenberg, Cheng et al.

Primary Examiner—O. R. Vertiz
Assistant Examiner—Wayne A. Langel
Attorney, Agent, or Firm—Joseph D. Kennedy; John D. Upham

[57] ABSTRACT

The reaction of carbon monoxide and water to produce hydrogen and carbon dioxide is catalyzed by a rhodium or iridium component with an iodide promoter.

19 Claims, 5 Drawing Figures

△ — DE NO. 1.— (Rh)=0.001M, (HI)=0.3M, T=185°C
● — DE NO. 2.3 (Rh)=0.005 M, (HI)=0.3M, T=175°C
○ — DE NO. 3.— (Rh)=0.001 M, (HI)=0.9M, T=175°C
■ — DE NO. 4.3 (Rh)=0.005 M, (HI)=0.9M, T=185°C
⬢ — DE NO. 5.3 (Rh)=0.001 M, (HI)=0.3M, T=175°C
▽ — DE NO. 6.— (Rh)=0.005 M, (HI)=0.3M, T=185°C
□ — DE NO. 7.— (Rh)=0.001 M, (HI)=0.9M, T=185°C
◆ — DE NO. 8.3 (Rh)=0.005 M, (HI)=0.9M, T=175°C
✪ — DE NO. 9.3 (Rh)=0.003 M, (HI)=0.6M, T=180.5°C

CATALYSIS OF WATER-GAS SHIFT REACTION

BACKGROUND OF THE INVENTION

The present invention relates to the reaction of carbon monoxide and water to produce hydrogen and carbon dioxide. In particular, it is directed to such process catalyzed by a rhodium or iridium component with an iodide promoter.

A number of heterogeneous catalysis systems are known for use in the water-gas shift reaction, employing oxides of such metals as nickel, iron and cobalt, at elevated temperatures such as 400° C. The water-gas shift reaction is used to produce hydrogen, particularly for use in the synthesis of ammonia.

As described in application of Arnold Hershman, Ser. No. 801,711, filed of even date herewith, it was found that the water-gas shift reaction can be effectively catalyzed by iodide-promoted rhodium or iridium catalysts at relatively low temperatures and pressures, particularly in the absence of other materials readily capable of carbonylation. The temperatures employed, such as 125° to 225° C., favor the production of hydrogen.

The catalysts have good activity and give good reaction rates at relatively mild temperatures. The process has other advantages characteristic of a hemogeneous liquid phase catalytic reaction.

It is known that the water-gas shift reaction may occur to some extent if water is present during carbonylation of various substrates, e.g. methanol, in the presence of carbonylation catalysts, but this reaction is very minor when rhodium or iridium catalysts are used. However iodide-promoted catalysts are very effective for the water-gas shift reaction when methanol and similar readily carbonylatable substrates are absent and substantial amounts of water are present.

General carbonylation conditions are useful herein (i.e., conditions used in carbonylation reactions) with iodide-promoted rhodium or iridium catalysts, with regulation of particular parameters to obtain advantages and desired results as described herein. Rhodium and iridium carbonylation catalysts are taught in Paulik et al U.S. Pat. Nos. 3,772,380 and 3,769,329, and Craddock et al U.S. Pat. Nos. 3,816,488, 3,816,489, 3,579,551 and 3,579,552.

It has now been discovered that concentrations and conditions have a very pronounced effect upon the water-gas reaction rates obtainable with the iodide-promoted rhodium and iridium catalysts utilized herein. In particular, as will be further discussed hereinbelow, the water concentrations, and the relationship of the water concentrations to the iodide concentration, having a strong effect upon reaction rates. The effect of acidity, in terms of the Hammett acidity function, upon the reaction rate is also discussed and factors affecting the acidity are described and illustrated.

Substrates which are readily carbonylatabe are substantially absent during the present process. Thus methanol and other hydroxyl-containing compounds or olefinic hydrocarbons and other materials with olefinic bonds are excluded in the present process.

In accordance with the present invention, carbon monoxide and water are reacted at temperatures from about 50° C. to 300° C., preferably 125° C. to 225° C., and at partial pressures of carbon monoxide from 1 p.s.i.a. to 15,000 p.s.i.a., preferably 5 p.s.i.a. to 3,000 p.s.i.a., and more preferably 25 p.s.i.a. to 1,000 p.s.i.a., although higher pressures may be employed, in the presence of a catalyst system comprised of rhodium-or iridium-containing component, and a promoter portion i.e., in iodide. A temperature range of 150° to 200° C. is particularly suitable, and at pressures say of 100 p.s.i.a. to 1,000 p.s.i.a. The iodide may be derived from iodine or iodine compounds.

For purposes of the present invention, the catalyst system essentially includes a rhodium or iridium component and a halogen component in which the halogen is iodine. Generally, the rhodium component of the catalyst system of the present invention is believed to be present in the form of a coordination compound of rhodium with an iodide component providing at least one of the ligands of such coordination compound. In addition to the rhodium or iridium and iodide, in the process of the present invention, these coordination compounds also generally include carbon monoxide ligands thereby forming such compounds or complexes, for example, as $[Rh(CO)_2I]_2$ and the like. Other moieties may be present if desired. Generally, it is preferred that the catalyst system contain as a promoting component, an excess of iodide over that present as ligands in the coordination compound. The terms "coordination compound" and "coordination complex" used throughout this specification mean a compound or complex formed by combination of one or more electronically rich molecules or atoms capable of independent existence with one or more electronically poor molecules or atoms, each of which may also be capable of independent existence.

The essential rhodium or iridium and iodide component of the catalyst system of the present invention may be provided by introducing into the reaction zone a coordination compound of rhodium or iridium containing iodide ligands or may be provided by introducing into the reaction zone separately a rhodium or iridium compound and an iodine compound. Among the materials which may be charged to the reaction zone to provide the rhodium component of the catalyst system of the present invention are rhodium metal, rhodium salts and oxides, organo rhodium compounds, coordination compounds of rhodium, and the like. Specific examples of materials capable of providing the rhodium constituent of the catalyst system of the present invention may be taken from the following non-limiting partial list of suitable materials.

$RhCl_3$
$RhBr_3$
$RhI_3$
$RhCl_3 \cdot 3H_2O$
$RhBr_3 \cdot 3H_2O$
$Rh_2(CO)_4Cl_2$
$Rh_2(CO)_4Br_2$
$Rh_2(CO)_4I_2$
$Rh_2(CO)_8$
$Rh[(C_6H_5)_3P]_2(CO)I$
$Rh[(C_6H_5)_3P]_2(CO)Cl$
Rh metal
$Rh(NO_3)_3$
$RhCl[(C_6H_5)_3P]_2(CH_3)]_2$
$Rh(SnCl_3)[(C_6H_5)_3P]_3$
$RhCl(CO)[(C_6H_5)_3As]_3$
$RHI(CO)[(C_6H_5)_3Sb]_2$
$[(n-C_4H_9)_4N][Rh(CO)_2X_2]$ where X—Cl,Br−,I—
$[n-C_4H_9)_4As][Rh_2(CO)_2Y_4]$ where Y—Br−,I—
$[(n-C_4H_9)_4P][Rh(CO)I_4]$ Rh[(C$_6$H$_5$)$_3$P]$_2$(CO)Br
Rh[n-C$_4$H$_9$)$_3$P]$_2$(CO)Br
Rh[(n-C$_4$H$_9$)$_3$P](CO)I
RhBr[(C$_6$H$_5$)$_3$P]$_3$
RhI[(C$_6$H$_5$)$_3$P]$_3$
RhCl[(C$_6$H$_5$)$_3$P]$_3$
RhCl[C$_6$H$_5$)$_3$P]$_3$H$_2$
[(C$_6$H$_5$)P]$_3$Rh(CO)H
Rh$_2$O$_3$
[Rh(C$_2$H$_4$)$_2$Cl]$_2$
K$_4$Rh$_2$Cl$_2$(SnCl$_3$)$_4$
K$_4$Rh-Br$_2$(SnBr$_3$)$_4$
K$_4$Rh$_2$I$_2$(SnI$_3$)$_4$ With those materials listed above as capable of providing the rhodium component which do not contain an iodine component, it will be necessary to introduce in the reaction zone such iodide component. For example, if the rhodium component introduced is rhodium metal or Rh$_2$O$_3$, it will be necessary to also introduce a halide component such as methyl iodide, hydrogen iodide, iodine or the like.

As noted above, while the halogen component of the catalyst system may be in combined form with the rhodium, as for instance, as one or more ligands in a coordination compound of rhodium, it generally is preferred to have an excess of halogen present in the catalyst system as a promoting component. By excess is meant an amount of halogen greater than 2 atoms of halogen per atom of rhodium in the catalyst system. This promoting component of the catalyst system consists of iodine and/or iodine compounds, such a hydrogen iodide, alkyl- or aryl iodide, metal iodide, ammonium iodide, phosphonium iodide, arsonium iodide, stibonium iodide and the like. The iodide of the promoting component may be the same or different from that already present as ligands in the coordination compound of rhodium.

Iodine or iodide compounds are suitable for the promoter portion of the catalyst, but those containing iodide are preferred, with hydrogen iodide constituting a more preferred member. Accordingly, suitable compounds providing the promoter portion of the catalyst system of this invention may be selected from the following list of preferred iodide and/or iodine containing compounds:

RI$_n$ where R=any alkyl, alkylene or aryl-group, e.g., Ch$_3$I, C$_6$H$_5$I, Ch$_3$Ch$_2$I, ICH$_2$I, etc. (n is 1-3)

Where R=any alkyl or aryl-group, e.g.,

R$_4$MI, R$_4$MI$_3$, or R$_3$MI$_2$ where R=hydrogen or any alkyl- or aryl-group, M=N, P, As or Sb, eg. NH$_4$I, PH$_4$I$_3$, PH$_3$I$_2$(C$_6$H$_5$)$_3$PI$_2$, and/or combinations of R M and I.

It is recognized that some moieties of suitable promoter compounds may be subject to carbonylation, but in view of the relatively small amounts generally involved, such carbonylation will not induly interfere with the reaction of carbon monoxide with water which may proceed after more readily reacting materials have been consumed.

Similarly, iridium components of catalyst systems can be charged as iridium metal, iridium salts and oxides, organo iridium compounds, coordination compounds of iridium, and the like, specific examples being IrCl$_3$, IrBr$_3$, IrI$_3$, IrCl$_3$·H$_2$O, and the various other materials illustrated by substituting Ir for Rh in any of the materials in the nonlimiting list of rhodium materials disclosed herein.

Generally it is preferred that the process of the present invention be carried out in an acidic reaction medium, as such appears characcteristic of, or to facilitate, conversions involved in the catalysis. The acidity is generally such as to be capable of forming alkyl halide from alcohol or olefin if such were added to the reaction medium, and particular acidity factors are further described herein.

The catalyst can be formed in situ in the reactor, or be formed separately. For instance, a catalyst precursor, e.g., RhCl$_3$·3H$_2$O or Rh$_2$O$_3$·5H$_2$O, may be dissolved in a dilute aqueous acid solution, e.g., HCl, acetic acid, etc., as solvent. Then the solution of the rhodium compound is heated, for example, to 60° C.–80° C., or in general at a temperature below the boiling point of the solvent, with stirring. A reducing agent such as carbon monoxide is bubbled through the said solution and subsequently, the iodine promoter is added as described herein.

Another embodiment of the present invention employs compounds of monovalent rhodium or iridium initially, wherein the transformation to active catalyst does not involve a change of valence. For example, monovalent rhodium salts such as Rh[(C$_6$H$_5$)$_3$P]$_3$Cl, [Rh(C$_6$H$_5$)$_3$P]$_3$(CO)Cl, Rh(C$_6$H$_5$)$_3$P]$_3$H and [Rh(CO)$_2$Cl]$_2$ are dissolved in a suitable solvent and carbon monoxide is subsequently passed through a solution that is preferably warmed and stirred. Subsequent addition of a solution of the halogen promoter, e.g., alkyl iodide, elemental iodine, aqueous HI, etc., results in formaion of an active carbonylation catalyst solution containing the necessary rhodium and iodide components. Iridium can be substituted for rhodium in any of the illustrative rhodium compounds herein above, and the preparation carried out as described.

In carrying out the reaction in liquid phase, any solvent compatible with the catalyst system and not interfering with the reaction may be employed. The preferred solvent and liquid reaction medium is a monocarboxylic acid having 2-20 carbon atoms, e.g. acetic, propionic, nonanoic, naphthoic, and elaidic acids, including isomeric forms. Other inert solvents can be employed, although in general it will be preferred to select solvents to provide a homogeneous medium with the water present, either with individual solvents, or by use of co-solvents, if appropriate.

The present process results in the production of hydrogen, along with carbon dioxide, and the gaseous hydrogen can readily be recovered as off-gases, from batch, continuous or semi-continuous procedures. The hydrogen can be separated from the carbon monoxide, carbon dioxide or other components of the gas stream, or also for some applications be used as a reactant stream without purification. The water-gas shift reaction itself can be run to reasonably high conversions, or in stages, to consume the carbon monoxide and give a product with fairly low concentrations of this component. However, it is preferred to operate with substantial carbon monoxide pressures, which mitigates against high conversions. The carbon dioxide product is also suitable for some uses, but may for some applications simply be removed from the product gas by scrubbing, absorption or similar procedures.

The reaction rate is dependent upon catalyst concentration and temperature. Concentrations of the rhodium or iridium compound or the first component of the catalyst system in the liquid phase between $10^{-6}$ moles/liter and 1 mole/liter, are normally employed, with the preferred range being 0.001 mole/liter to 0.5 mole/liter. Higher concentrations than those set forth herein may, however, be used if desired. Higher temperatures also favor higher reaction rates.

The concentration of the second or promoter component of the catalyst system can vary widely but will generally be selected to give good rates with the particular catalyst concentration and other conditions, and usually being within the range of about $10^{-2}$ moles/liter to 10 moles/liter based on iodine atom, or more narrowly 0.1 mole/liter to 5 mole/liter. The preferred amounts will be affected by the particular promoter, being influenced by its reactivity and availability of the iodine content, as well as by its effect on acidity or other characteristics of the reaction medium, but are often about 0.1 mole/liter to 2 moles/liter. The relationship of promoter and its acidity, and the water concentrations, and their significance is further described hereinbelow.

For the water-gas shift reaction, one mole of carbon monoxide is required for each mole of water, but either component can be used in excess. The reaction can suitably be conducted with ratios of the reactants suitable for good reaction rates, with additional reactants supplied to the reaction to replace those consumed. In practice appropriate pressures of carbon monoxide may simply be selected to give good rates. However, for economic reasons or to have product suitable for particular application, it may be appropriate to select conditions to give high conversions of the carbon monoxide, which may include use of excess water. On the other hand, CO pressure contributes to catalyst stability and may affect reaction rate. The water will generally be employed in concentrations suitabe to give desired reaction rates. Generally, a substantial amount of water will be present ranging up to dilute aqueous solutions containing the catalytic components, but adjusted along with other factors as taught herein to give desirable reaction rates.

Procedures employed in the following examples which illustrate the invention were carried out in an autoclave reactor with a 1500 ml. capacity, with a liquid charge of 500 ml., and an agitator speed of 500 rpm. In general the procedures were carried out in the same manner for comparison purposes. A catalyst slurry was formed by mixing hydrated rhodium oxide with concentrated hydriodic acid (57%), and stirring for 10 minutes under a nitrogen purge, followed by water and acetic acid with stirring under the nitrogen purge for an additional 10 minutes. The catalyst slurry was then transferred to the autoclave reactor with agitation and additional water, acetic acid, HI or other components as necessary to attain the concentrations as reported herein.

The reactor was flushed with CO by pressuring and venting, and charged to desired partial pressure of CO, and stirred and heated to desired temperature, with a small flow of off-gas. When the desired temperature was attained, the off-gas rate, measured by a rotameter, was increased to about 1000 ml./minute. The off-gas was sampled by mass spectrometer and a chromatographic analyzer. Rate determinations were made when the off-gas showed a nearly constant composition, being calculated on the $CO_2$ content as analyzed by the chromatographic analyzer. The mass spectrometric analyses for $CO_2$ was generally in good agreement with the chromatographic analysis and in most cases the mass spectrometric analyses showed the hydrogen and $CO_2$ content to be substantially equivalent. The water concentrations were determined by anaylsis after the reaction was stopped in some cases, as well as by measurement of the initial charge. The procedures were generally completed in about one hour.

EXAMPLE 1

Several preparations in accord with the above procedure were carried out at varying conditions of temperature, pressure, and concentrations of HI and water. Results are reported in Table 1. The various conditions are shown to have a significant effect on the rate. In the particular sources used in this example, at the lower water conditions, the lower HI concentrations have a favorable influence. At a 1.2 molar HI concentration, the rate is higher at 22.5 M water than at either 7.5 M or 30 M. (M as used herein means moles/liter, i.e. molar). Higher temperatures enhance the rate.

TABLE I

| | | | (Agitator Speed - 500 RPM) | | | | |
| | | Total | Concentration moles/l | | | | |
| Run No. | Temp. °C. | Pres. psig | Rh | HI | Initial $H_2O$ | Other | Water-Gas Rate* |
| --- | --- | --- | --- | --- | --- | --- | --- |
| 1 | 170 | 300 | 0.005 | 1.2 | 30 | — | 0.032 |
| 2 | 170 | 200 | 0.005 | 1.2 | 22.5 | — | 0.880 |
| 3 | 170 | 300 | 0.005 | 1.2 | 22.5 | — | 0.362 |
| 4 | 170 | 450 | 0.005 | 1.2 | 22.5 | — | 0.445 |
| 5 | 185 | 450 | 0.005 | 1.2 | 22.5 | — | 1.86 |
| 6 | 170 | 300 | 0.005 | 1.2 | 7.5 | — | 0.041 |
| 7 | 170 | 500 | 0.005 | 1.2 | 7.5 | — | 0.056 |
| 8 | 170 | 300 | 0.005 | 0.6 | 7.5 | — | 0.193 |
| 9 | 170 | 400 | 0.005 | 0.6 | 7.5 | — | 0.149 |
| 10 | 170 | 500 | 0.005 | 0.6 | 7.5 | — | 0.173 |
| 11 | 170 | 200 | 0.005 | 0.3 | 7.5 | — | 0.346 |
| 12 | 170 | 300 | 0.005 | 0.3 | 7.5 | — | 0.292 |
| 13 | 170 | 300 | 0.005 | 0.3 | 7.5 | 0.9 M NaI | 0.265 |

TABLE I-continued

| | | | (Agitator Speed - 500 RPM) | | | | |
|---|---|---|---|---|---|---|---|
| | | Total | Concentration moles/l | | | | |
| Run No. | Temp. °C. | Pres. psig | Rh | HI | Initial $H_2O$ | Other | Water-Gas Rate* |
| 14 | 170 | 300 | 0.005 | 0.3 | 7.5 | 0.9 M HCl | 0.360 |
| 15 | 170 | 300 | 0.005 | 0 | 7.5 | 1.2 M HCl | 0.0027 |

*Moles of $CO_2$ Produced per Liter of Reactor Solution per Hour

EXAMPLE 2

A set of experiments in accord with the above procedure were carried out to determine the effects of temperatures and concentrations of HI, water and rhodium over ranges as follows Rhodium—0.001M to 0.005M
HI—0.3M to 0.9M
Water—7M to 23M
Temperature—175° C. to 185° C.

Figure 1:
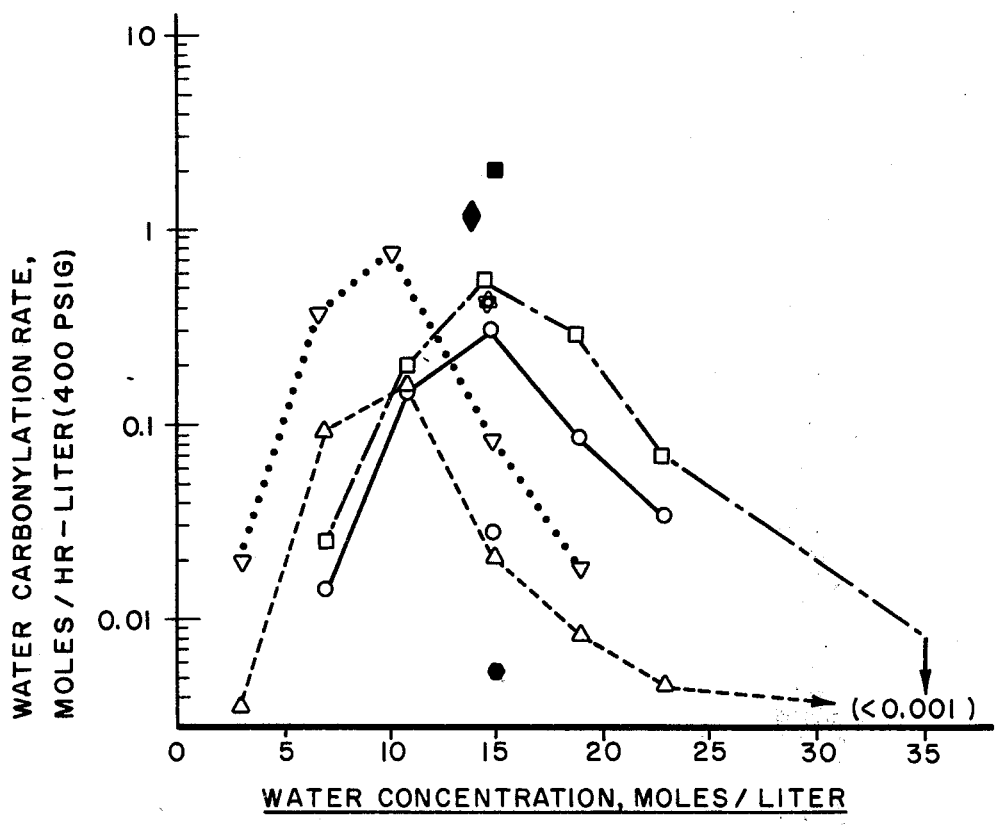
FIG. 1 is a plot of water carbonylation rate, in moles/hr-liter (400 psig) versus water concentration in moles/liter.

The initial design of the experiments is set forth in Table 2, and the experiments as carried out, with ssome modifications, are reprted in Table 3. The water-gas rate goes through a maximum with changing water concentration in each of the sets where other reaction variables were held constant. Relatively low rates occurred at 3M and 23M water concentration. At a 35M water concentration under the described conditions, there was apparently no significant water-gas reaction. The effects of water concentration under the described conditions are illustrated in FIG. 1.

The water-gas reaction appears to be accelerated by higher temperatures at all water levels, as indicated by the results in Table 3, and also higher rhodium concentrations increase the rate.

TABLE 2

Water-Gas Reaction - Statistical Design of Experiment
(Total Pressure = 400 psig; Agitator Speed = 500 RPM)

| Run, DE# | Rhodium Level | HI Level | Temp. Level | Initial Water Levels (DE#- .1 to .5) | | | | |
|---|---|---|---|---|---|---|---|---|
| 1.1–1.5 | −1 | −1 | +1 | −2 | −1 | 0 | +1 | +2 |
| 2.3 | +1 | −1 | −1 | | | 0 | | |
| 3.1–3.5 | −1 | +1 | −1 | −2 | −1 | 0 | +1 | +2 |
| 4.3 | +1 | +1 | +1 | | | 0 | | |
| 5.3 | −1 | −1 | −1 | | | 0 | | |
| 6.1–6.5 | +1 | −1 | +1 | −2 | −1 | 0 | +1 | +2 |
| 7.1–7.5 | −1 | +1 | +1 | −2 | −1 | 0 | +1 | +2 |
| 8.3 | +1 | +1 | −1 | | | | | |
| 9.3 | 0 | 0 | 0 | | | 0 | | |

Rhodium Concentrations at −1, 0, +1 levels: −1 = 0.001M, 0 = 0.003M, +1 = 0.005M
HI Concentrations at −1, 0, +1 levels: −1 = 0.3M, 0 = 0.6M, +1 = 0.9M
Temperature at −1, 0, +1 levels: −1 = 175°, 0 = 180° C., +1 = 185° C.
Initial Water Concentrations at −2, −1, 0, +1, +2 levels: −2 = 7M, −1 = 11M, 0 = 15M, 0 = 19m, +2 = 23M

TABLE 3

(Agitator Speed = 500 RPM, Total Pressure = 400 psig)

| Exp. DE# | Rhodium Conc. moles/l | HI Conc. moles/l | Temp., °C. | Water Conc. moles/l[1] | Hammett Acidity Function($-H_0$) of Reactor Solution[2] | Water-Gas Rate moles/l-hr[3] |
|---|---|---|---|---|---|---|
| 1.0 | 0.001 | 0.3 | 185 | 3 | +1.18 | 0.0036 |
| 1.1 | 0.001 | 0.3 | 185 | 6.9[4] | +0.42 | 0.0935 |
| 1.2 | 0.001 | 0.3 | 185 | 10.8[5] | −0.19 | 0.163 |
| 1.3 | 0.001 | 0.3 | 185 | 15 | −0.55 | 0.021 |
| 1.4 | 0.001 | 0.3 | 185 | 19 | −0.81 | 0.0085 |
| 1.5 | 0.001 | 0.3 | 185 | 23 | −0.96 | 0.0047 |
| 2.3 | 0.005 | 0.3 | 175 | 15 | −0.50 | 0.028 |
| 3.1 | 0.001 | 0.9 | 175 | 7 | +0.88 | 0.0143 |
| 3.2 | 0.001 | 0.9 | 175 | 10.8[5] | +0.52 | 0.152 |
| 3.3 | 0.001 | 0.9 | 175 | 14.8[6] | +0.26 | 0.305 |
| 3.4 | 0.001 | 0.9 | 175 | 19 | +0.06 | 0.0875 |
| 3.5 | 0.001 | 0.9 | 175 | 23 | −0.06 | 0.0349 |
| 4.3 | 0.005 | 0.9 | 185 | 14.0[6] | +0.31 | 1.47 |
| 4.3A | 0.005 | 0.9 | 185 | 15.0[7] | +0.26 | 2.03 |
| 5.3 | 0.001 | 0.3 | 175 | 15 | −0.55 | 0.0054 |
| 6.0 | 0.005 | 0.3 | 185 | 3 | +1.18 | 0.0203 |
| 6.1 | 0.005 | 0.3 | 185 | 6.6[4] | +0.47 | 0.376 |
| 6.2 | 0.005 | 0.3 | 185 | 10.1[5] | −0.12 | 0.753 |
| 6.3 | 0.005 | 0.3 | 185 | 14.9[6] | −0.54 | 0.0844 |
| 6.4 | 0.005 | 0.3 | 185 | 19 | −0.81 | 0.0188 |
| 7.1 | 0.001 | 0.9 | 185 | 7 | −0.88 | 0.0255 |
| 7.2 | 0.001 | 0.9 | 185 | 10.8[5] | +0.52 | 0.2011 |
| 7.3 | 0.001 | 0.9 | 185 | 14.5[6] | +0.28 | 0.546 |
| 7.4 | 0.001 | 0.9 | 185 | 18.8[8] | +0.07 | 0.290 |
| 7.5 | 0.001 | 0.9 | 185 | 22.9[9] | −0.06 | 0.0704 |
| 8.3 | 0.005 | 0.9 | 175 | 13.9[6] | +0.32 | 1.18 |
| 9.3 | 0.003 | 0.6 | 180.5 | 14.6[6] | −0.01 | 0.440 |

1. Water concentration determined by analysis of the reactor solution after stopping the reaction.
2. Acidity function value = $-H_0$) Determined by extrapolation from the values measured at 0.1M, 0.36M and 0.87M HI concentrations, by the procedure of M. A. Paul and F. A. Long, Chem. Reviews Vol. 57, page 1, 1957.
3. Moles of $CO_2$ formed per liter of reactor solution per hour.
4. Initial $H_2O$ concentration = 7M
5. Initial $H_2O$ concentration = 11M
6. Initial $H_2O$ concentration = 15M
7. Initial $H_2O$ concentration = 16.7M
8. Initial $H_2O$ concentration = 19M
9. Initial $H_2O$ concentration = 23M

TABLE 4

Rhodium-Catalyzed Water-Gas Reaction - Effects of Additives
(Rh)=0.001M. Temp.=185° C., Total Pressure=400 psig. Agitator speed=500 RPM)

| $H_2O$ | HI | NAI | HCl | Other | Hammett Acidity Function $-H_0$ of Reactor Solution | Water-Gas Rate moles/1-hr[2] |
|---|---|---|---|---|---|---|
| 6.9 | 0.3 | — | — | — | +0.2[3] | 0.0935 |
| 7.0 | 0.9 | — | — | — | +0.88[3] | 0.0255 |
| 6.9 | 0.3 | 0.6 | — | — | +0.58[4] | 0.0755 |
| 6.9 | 0.3 | — | 0.6 | — | +1.14[4] | 0.101 |
| 15.0 | 0.3 | — | — | — | −0.55[3] | 0.021 |
| 14.5 | 0.9 | — | — | — | +0.28[3] | 0.546 |
| 14.9 | 0.3 | 0.6 | — | — | −0.02[4] | 0.152 |
| 15.0 | 0.3 | — | 0.6 | — | +0.18[4] | 0.069 |
| 15.0 | 0.3 | — | — | 0.6M KCl | — | 0.0049 |
| 15.0 | 0.3 | — | — | 0.072M $FeI_2$ | — | 0.037 |
| 14.9 | 0.3 | — | — | 0.145M $NiI_2$ | — | 0.051 |
| 15.0 | 0.3 | — | — | 0.145M Nickel(ous) Acetate | — | 0.0018 |
| 15.0 | 0.3 | — | — | 0.6M $H_3PO_2$ | — | 0.050[5] |
| 14.9 | 0.3 | — | — | 0.3M $Na_2SO_4$ | — | 0.110[5] |
| 23.0 | 0.3 | — | — | — | −0.96[3] | 0.0047 |
| 22.9 | 0.9 | — | — | — | −0.06[3] | 0.0704 |
| 23.9 | 0.3 | 0.6 | — | — | −0.65[4] | 0.007 |
| 23.0 | 0.3 | — | 0.6 | — | −0.01[4] | 0.0101 |

1. Water concentration determined by analysis of the reactor solution after stopping the reaction.
2. Moles of $CO_2$ formed per liter of reactor solution per hour.
3. Acidity function values $(-H_0)$ determined by extrapolation from the value measured at 0.1M, 0.36M and 0.87M HI concentrations.
4. Acidity function values $(-H_0)$ measured for solutions of these concentrations of water, HI, NaI or HCl, ACOH. (acetic acid)
5. Rate was not steady.

EXAMPLE 3

In order to appraise the effects of total iodide and acidity, several preparations were carried out using the same general procedure as above, but with sodium iodide and hydrochloric acid in addition to HI. The results, along with runs using several other additives, are reported in Table 4. The order of the water gas rates was as follows:

TABLE 5

| Water Conc. | Relative Water-Gas Rates |
|---|---|
| 7M | (0.3M HI + 0.6M HCl)>0.3M HI>(0.3M HI + 0.6M NaI)>0.9M HI |
| 15M | 0.9M HI>(0.3M HI + 0.6M NaI)>(0.3M HI + 0.6M HCl)>0.3M HI |
| 23M | 0.9M HI>(0.3M HI + 0.6M HCl)>(0.3M HI + 0.6M NaI)>0.3M HI |

A possible mechanism of the water-gas reaction involves oxidation of a rhodium complex by HI with production of hydrogen, followed by reduction of the complex by water and carbon monoxide to produce carbon dioxide and regenerate HI. Such reactions can be illustrated:

$$Rh(CO)_2I_2^- + 2HI \rightarrow Rh(CO)I_4^- + CO + H_2$$

$$Rh(CO)I_4^- + H_2O + 2CO \rightarrow Rh(CO)_2I_2^- + CO_2 + 2HI$$

The net result of such reaction in which Rh(I) is oxidized to Rh(III) and reduced back to Rh(I) is the water gas reaction:

$$H_2O + CO \rightarrow H_2 + CO_2$$

From experiments in which the valence state of rhodium complexes was measured under carbon monoxide in water-HI-acetic acid solutions it was found that relative amounts of Rh(III) complex increase with increasing HI, while relative amounts of Rh(I) are higher at higher water levels. This indicates that under water-gas reaction conditions, the oxidation step would be enhanced by higher HI or retarded by higher water concentrations, while the reduction step would be retarded by higher HI but enhanced by higher water levels.

It can be seen from FIG. 1, and other results reported herein, high water concentration can have a very marked effect upon the water-gas rate. The rates in FIG. 1 are on a log scale, and the maxima are in some cases 100 fold or more greater than minimum values for the same conditions except for the different water concentrations. Ordinarily it will be desirable to operate in the range of about 3 or 10 to about 25 or so moles/liter of water, although the ranges can be extended somewhat by use of higher temperatures, higher catalyst concentration, etc., or affected by the presence of other components or the form of the iodide promoter. A more prescribed range is 5 or 10 to 25 moles/liter of water. In some circumstances it may be appropriate to use up to 30 or more moles/liter of water.

With given concentrations and forms of the iodide promoter e.g. HI, and other conditions, it will be desirable to operate at a water concentration about that to provide the maximum water gas rate, or within about a 5 molar range on each side of such concentration. Such concentrations can be established by initial charge, or established or maintained by addition of components during the reaction with adjustment of addition rates as appropriate.

While the relationship of HI and water influences the illustrated oxidation and reduction steps and the overall water-gas rate, the steps are also influenced by acidity which can be affected by additional components if present. Thus experiments have shown that increasing acidity promotes the oxidation of the rhodium complex, while declining acidity promotes the reduction of the rhodium complex. Thus the acidity will desirably be such as to permit both steps to occur at reasonable rates, with the slower being more determinative of the overall rate and more susceptible to promotion by changes in acidity to affect the overall water-gas rate. Since the present reaction media generally involve non-aqueous solvents along with water, the pH of the solution is not a valid measure of its true acidity. The neutral Hammett acidity function [$-H_0$] was used to correlate the acidity of the solution with the water-gas rate. In either aqueous or non-aqueous solutions, the $-H_0$ is determined colorimetrically by the degree of association of the acidic species with an organic base. $H_0$ has the same relationship to effective acidity ($h_0$) as pH has to hydrogen ion concentration [$H^+$] in dilute aqueous solution. For the reaction media employed herein, the relationship of the Hammett acidity fraction and the "effective acid concentration" can be expressed $$-H_0 = \log h_0$$

where:
$-H_0$ = Hammett acidity function
$h_0$ = "effective acid concentration"

Figure 2:
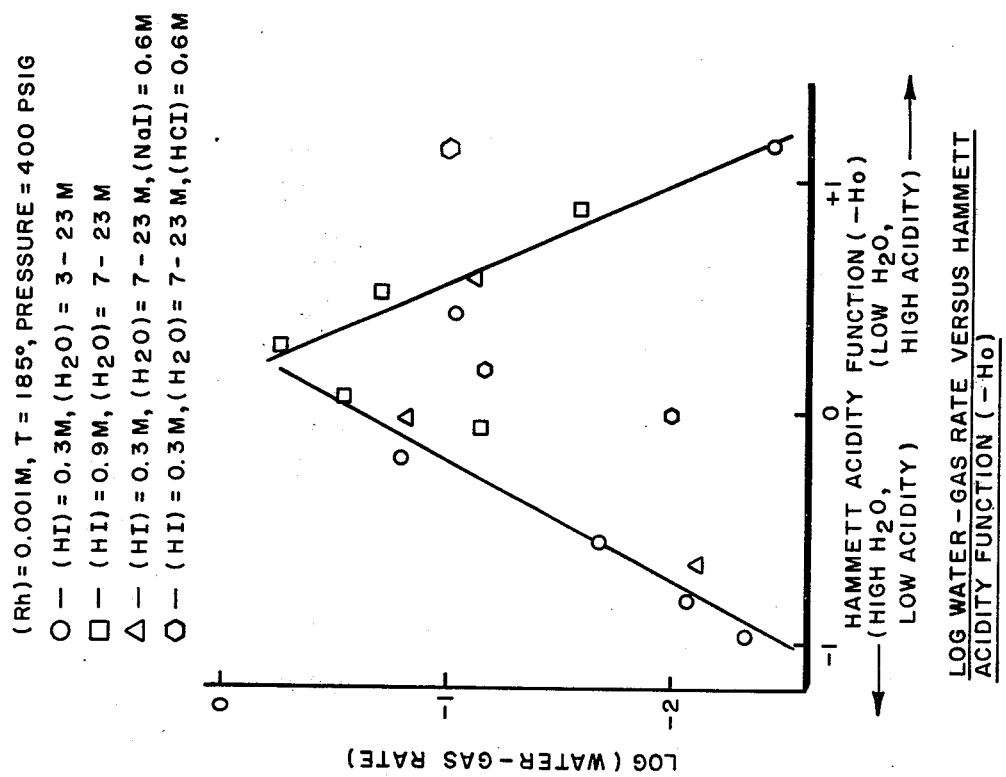

For HI concentrations in the range of 0.1M to 0.9M in varying water-acetic acid solutions, the acidity function was found to be very high at low water concentrations and to decrease rapidly with increasing water concentrations, in the manner usually characteristic of the Hammett acidity function. The $-H_0$ function varies over about 2 units in the range of about 3M to 23M, so the effective acid concentration ($h_0$) varies approximately 100 fold over the range. Thus if the water-gas rate is influenced by effective acidity, small changes in water concentration would greatly affect the water-gas rate. The relationship between the Hammett acidity function and the water-gas rate is illustrated in FIG. 2 where the Hammett function is plotted against the water-gas rate for a number of reaction media of varying water and HI or other iodide component content (in acetic acid). The values at the lower and higher acidity levels of the illustrated range fall in nearly straight lines. The maximum rate occurs at a Hammett acidity function of approximately +0.2. At less acidic-values, there is a line of positive slope indicating that increasing acidity promotes the reaction. At more acidic values, there is a line of negative slope indicating that increasing acidity retards the reaction. Also, the figure shows the general significance of effective acid concentration to the rate and the usual desirability of staying within Hammett Acidity Function ranges of about $-1$ to about 1.2, for faster rates in the range of about $-0.4$ to $+0.8$. The presence of other components, such as HCl, can cause some variation in the results, as illustrated in FIG. 2. In such event Hammett acidity function range based on only the HI and water present in the reaction medium may be relevant.

Figure 3:
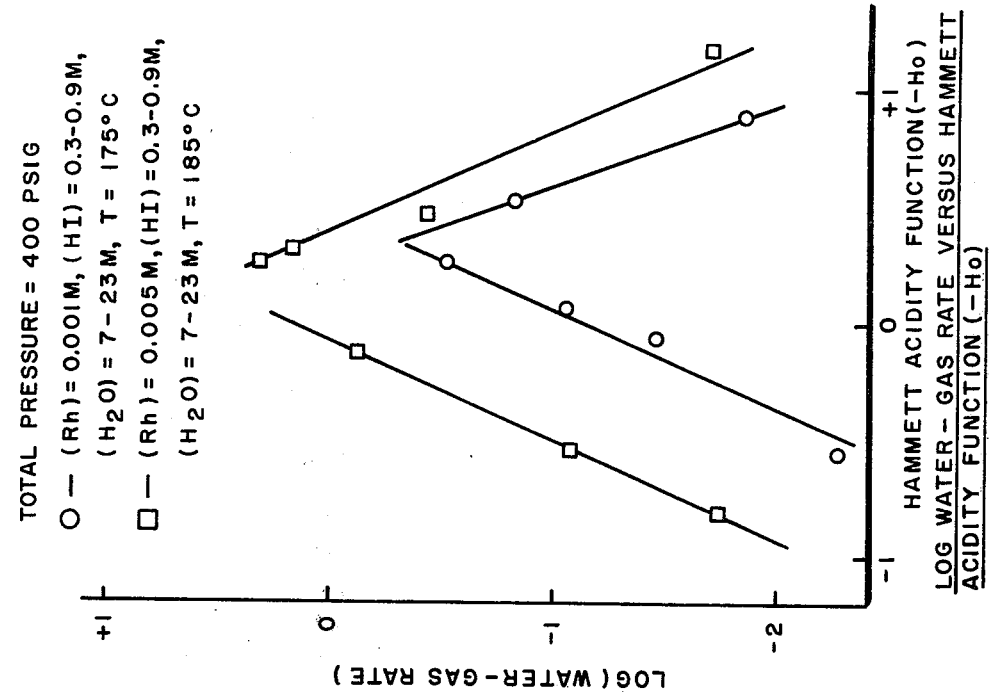
FIGS. 2, 3, and 5 are plots of log (water-gas rate) versus Hammett acidity function ($-Ho$).

The significance of the effective acidity is further illustrated in FIG. 3 in which the log of the water-gas rate is plotted against the Hammett acidity function for different temperatures and rhodium concentrations. The figure shows the expected increase in rates with temperature and rhodium concentration, but the increase is greater at lower acidity, causing a shift in the maximum rate to a lower acidity value. However, it is still desirable to operate at appropriate acidity to give good rates, and this will generally be in the range of Hammett acidity of about $-1$. to about $+1.2$ or so, recognizing that even within the range it will be desirable to operate at values near those producing the maximum rate. In the event of anomalies due to the presence of other, or different components or conditions than those illustrated, it will be appropriate to operate at Hammett acidity functions of the reaction media which appear to give water-gas rates near the maximum, or more broadly sufficiently near that for the maximum rate to maintain rates at lease one-tenth of the maximum rate. Water, iodide or other components can be added or removed as suitable for maintaining proper acidity.

While the Hammett acidity is significant to the reaction rates, it may not be necessary to actually determine such acidity in order to conduct the reaction at proper acidity, as, for example, optimum concentrations of water for particular HI concentrations can be determined empirically for a Rh catalyst in an HI-water system, and the Hammett acidity will be a function of these components. The present invention is especially concerned with the discovery of the very marked effect of the water concentration upon the water-gas reaction rate. However the rate is also influenced by catalyst concentration, temperature, carbon monoxide pressure and similar factors, and these can be adjusted as taught herein, along with the water concentration and related factors, to give rates suited to desired production processes. It may be desirable to use rhodium concentrations well above those illustrated herein if necessary to obtain suitable rates. Since rhodium is a scarce and expensive material, it may be preferable to regulate the amount of iodide promoter, using for example at least about 0.3 molar amounts, or at least 0.5 molar, or possibly more than 1 molar. It will be recognized that the attainable rates will be considered along with conversions, selectivity, and various economic expense factors in determining the most appropriate conditions for conducting the process. Many of the illustrative procedures herein use rhodium or iridium concentrations in the range of 0.001M to 0.005M, or more broadly 0.0005M to 0.01M, and such ranges may be found most suitable for general application. The HI promoter may often be used in the range of about 0.1M to 1M, but broader ranges, e.g. 0.05M to about 5M or higher may be used. Preferred temperatures for use along with the foregoing ranges are generally about 150° C. to 200° C.

In accord with the general procedure described hereinabove and utilized in the above Examples, the water-gas shift reaction was conducted with iridium as catalyst, that is substituting iridium for rhodium. Results are reported in Table 6.

TABLE 6

Iridium Catalyzed Water-Gas Reaction
(Agitation Speed = 750 rpm)

| Temp. °C. | Concentration, Moles/l | | | | -Ho | CO2 Formation Rate, Moles/1-hr | | |
|---|---|---|---|---|---|---|---|---|
| | Ir | HI | H2O | Other | | 500 psig | 250 psig | 200 psig |
| 185° | 0.001 | 0.1 | 3 | — | +0.14 | 0 | — | 0 |
| " | " | " | 7 | — | −0.49 | 0.0125 | — | — |

TABLE 6-continued

Iridium Catalyzed Water-Gas Reaction
(Agitation Speed = 750 rpm)

| Temp. °C. | Concentration, Moles/l | | | | -Ho | $CO_2$ Formation Rate, Moles/l-hr | | |
|---|---|---|---|---|---|---|---|---|
| | Ir | HI | $H_2O$ | Other | | 500 psig | 250 psig | 200 psig |
| " | " | " | 11 | — | −0.99 | 0.0152 | — | 0.0137 |
| " | " | " | 15 | — | −1.38 | 0.00350 | — | $(0.011)^{(2)}$ |
| " | " | " | 20.1 | — | | 0.00381 | — | 0.00995 |
| " | " | " | 23 | — | | 0.00633 | — | 0.000072 |
| " | " | " | 9 | — | −0.75 | 0.0248 | — | 0.00765 |
| " | " | " | 5 | — | −0.18 | <0.0001 | — | — |
| 200° | " | " | 7 | — | −0.49 | 0.0073 | <0.001 | — |
| " | " | " | 11 | — | −0.99 | $(0.0465)^{(1)}$ 0.0304 | | — |
| 190° | " | 0.3 | 9 | — | +0.03 | 0.00563 | — | 0.00171 |
| 185° | " | 0.3 | 3 | — | +1.18 | 0 | — | — |
| " | " | " | 7 | — | +0.38 | <0.001 | — | — |
| " | " | " | 11 | — | −0.14 | 0.0473 | $0.0342^{(3)}$ | 0.012 |
| " | " | " | 15 | — | −0.50 | 0.0184 | — | 0.0187 |
| " | " | " | 11 | — | −0.14 | 0.0108 | — | 0.00318 |
| " | " | " | 15 | — | −0.50 | 0.000579 | — | 0.00056 |
| " | " | " | 7 | — | +0.38 | 0.00121 | — | 0 |
| " | " | " | 13 | — | −0.33 | 0.00779 | — | 0.00690 |
| 185° | 0.001 | 0.1 | 6 | — | −0.33 | 0.000264 | — | — |
| 185° | 0.001 | 0.3 | 19 | — | −0.73 | $0.00406^{(4)}$ | — | 0.00130 |
| " | " | " | 23 | — | −0.88 | 0.00394 | — | 0.00825 |
| " | " | " | 15 | — | −0.50 | 0.00179 | — | 0.00588 |
| 185° | 0.001 | 0.9 | 15 | — | +0.26 | 0.0115 | — | 0.00276 |
| " | " | " | 11 | — | +0.54 | 0.000184 | — | 0 |
| " | " | " | 19 | — | +0.06 | 0.00162 | — | <0.0001 |
| 185° | 0.001 | 0.3 | 14.9 | 0.6 M NaI | 0.00 | 0.0323 | — | 0.03 15 |
| " | " | " | 11 | " | ~10.3 | 0.0169 | — | 0.0104 |
| " | " | " | 7 | " | +0.58 | 0.00035 | — | <0.0001 |
| " | " | " | 19 | " | ~ −0.38 | 0.00421 | — | 0.0139 |

Figure 5:
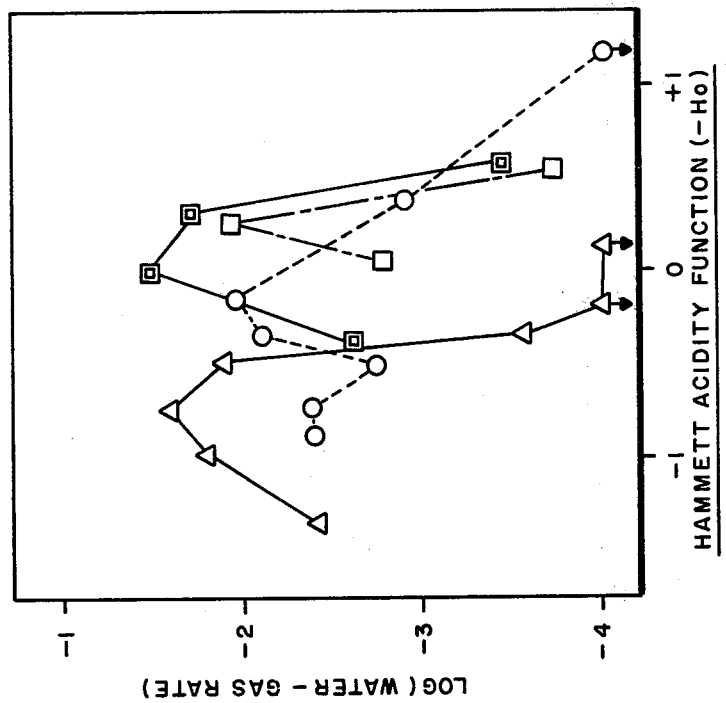
Figure 4:
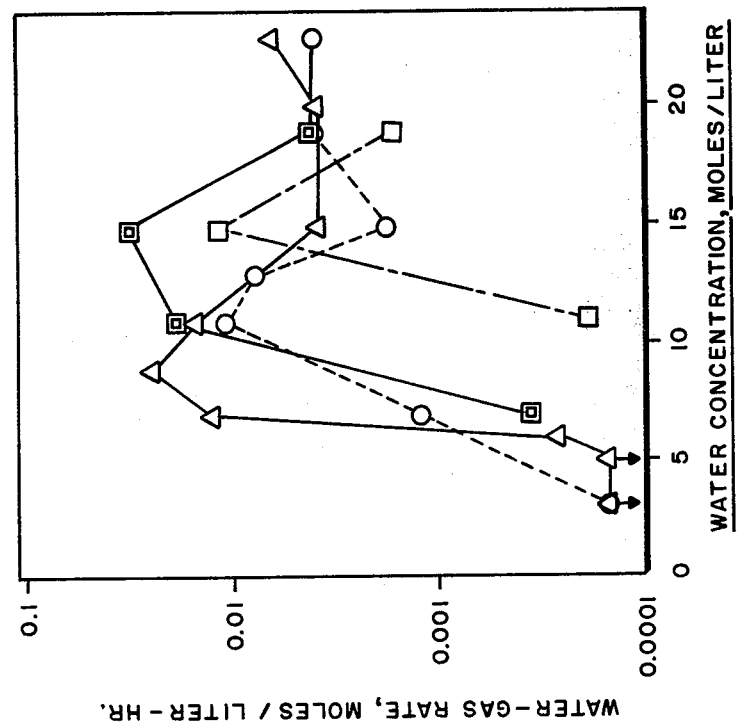
FIG. 4 is a plot of water-gas rate in moles/liter-hr. versus water concentration in moles/liter.

The water concentration had a strong influence on the rate, as illustrated in FIG. 4 in which the water-gas rate is plotted against water concentration. The Hammett acidity function is also significant as illustrated in FIG. 5 where the log of the water-gas rate is plotted against it. While there is some variance from the results with rhodium, and the rates are in general lower, some of the same considerations apply. Thus desirable water concentration will generally lie in the ranges discussed above. In particular, the water concentration will usually be at least about 5 molar with iridium, as well as with rhodium, and it will be desirable to operate at values of water concentrations within a 5 molar range or so on each side of those to give the peak rate, and to operate at Hammett acidity functions approaching those where maximum rates are found, and generally approximately in the ranges described with respect to rhodium above, and the ranges and other parameters herein are to be understood as generally applicable to both rhodium and iridium catalysts unless specified otherwise. Aside from whether the process is conducted within particular ranges or other parameters, it will be desirable to conduct the reaction with water concentrations and acidity appropriate for acceptable reaction rates.

In the performance of the process in accord with the present invention it will be recognized that water is consumed and concentrations of other components may change during the course of the reaction. In practicing the invention water can be added as consumed, and other components can be added or removed to maintain desired reaction conditions, and in particular to maintain water concentrations and acidity levels near those producing maximum rates, or within desired ranges thereof, as taught herein.

The illustrative procedures herein indicate the effect of various reaction parameters, concentrations and materials upon the reaction rate and results. The effects thus demonstrated can be utilized in the determination of conditions desirable for production processes, for example, by selecting catalyst concentrations and temperatures sufficient, in combination with water concentration, acidity, etc. in ranges described herein, to achieve desirable production rates, such as better than 5 or 6 moles/liter/hour of catalyst-containing solution. If necessary to achieve such rates, rhodium or iridium concentrations can be raised as high as 0.01 or more moles/liter, temperatures as high as 200° C. or higher, and the iodide promoter as high as 0.5 moles/liter or higher, even over 1 mole/liter, but controlled in conjunction with the water concentration maintaining conditions for good reactivity as taught herein.

What is claimed

1. A process for the reaction of carbon monoxide and water to produce hydrogen and carbon dioxide which comprises contacting carbon monoxide and water in liquid phase in substantial absence of other carboxylatable components with a catalyst consisting essentially of a rhodium or iridium compound and an iodide promoter, and in which the water concentration is controlled to the range of 3 to 25 molar, and recovering gaseous products.

2. The processs of claim 1 in which the water concentration is within a 5 molar range of the concentration to give maximum reaction rates.

3. The process of claim 2 in which the temperature is in the range of about 150° to about 225° C., the carbon monoxide partial pressure about 100 to 1000 psi., and the rhodium or iridium concentration is from 0.001 to 0.5 moles/liter.

4. The process of claim 3 in which the total iodide concentration is in the range of 0.1 to 5 molar.

5. The process of claim 3 in which the total iodide concentration is in the range of 0.1 to 2 molar.

6. The process of claim 2 in which HI is added as promoter and acetic acid solvent is employed.

7. The process of claim 2 in which the process is operated on a continuous basis and water is added during the process to maintain concentration near those for the maximum rate.

8. The process of claim 1 in which acetic acid solvent is present.

9. The process of claim 1 in which iodine is added as HI.

10. The process of claim 1 in which rhodium catalyst is employed.

11. The process of claim 1 in which iridium catalyst is employed.

12. The process of claim 1 in which carboxylic acid solvent is employed.

13. The process of claim 1 is which catalyst concentration and temperature are sufficient for a water gas rate of at least 5 moles/liter/hour.

14. The process for the reaction of carbon monoxide and water to produce hydrogen and carbon dioxide which comprises contacting carbon monoxide and water in liquid phase with a catalyst consisting essentially of a rhodium or iridium compound and an iodide promoter with the concentrations being such as to provide a Hammett acidity level in the range of $-1$ to $+1.2$ and sufficiently near that for the maximum reaction rate that the reaction rate is at least one-tenth that of the maximum reaction rate.

15. The process of claim 14 in which acetic acid solvent is employed.

16. The process of claim 15 in which the Hammett acidity is near that for the maximum reaction rate.

17. The process of claim 14 in which the water concentration is in the range of about 3 to 25 molar.

18. The process of claim 14 in which the HI is present in concentrations of at least about 0.3M.

19. The process of claim 14 in which carboxylic acid solvent is employed.

* * * * *